EXTRACTION EQUILIBRIUM CURVES FOR MO EXTRACTION WITH DEHPA-DBBP AND DEHPA-TBP MIXED EXTRACTANTS
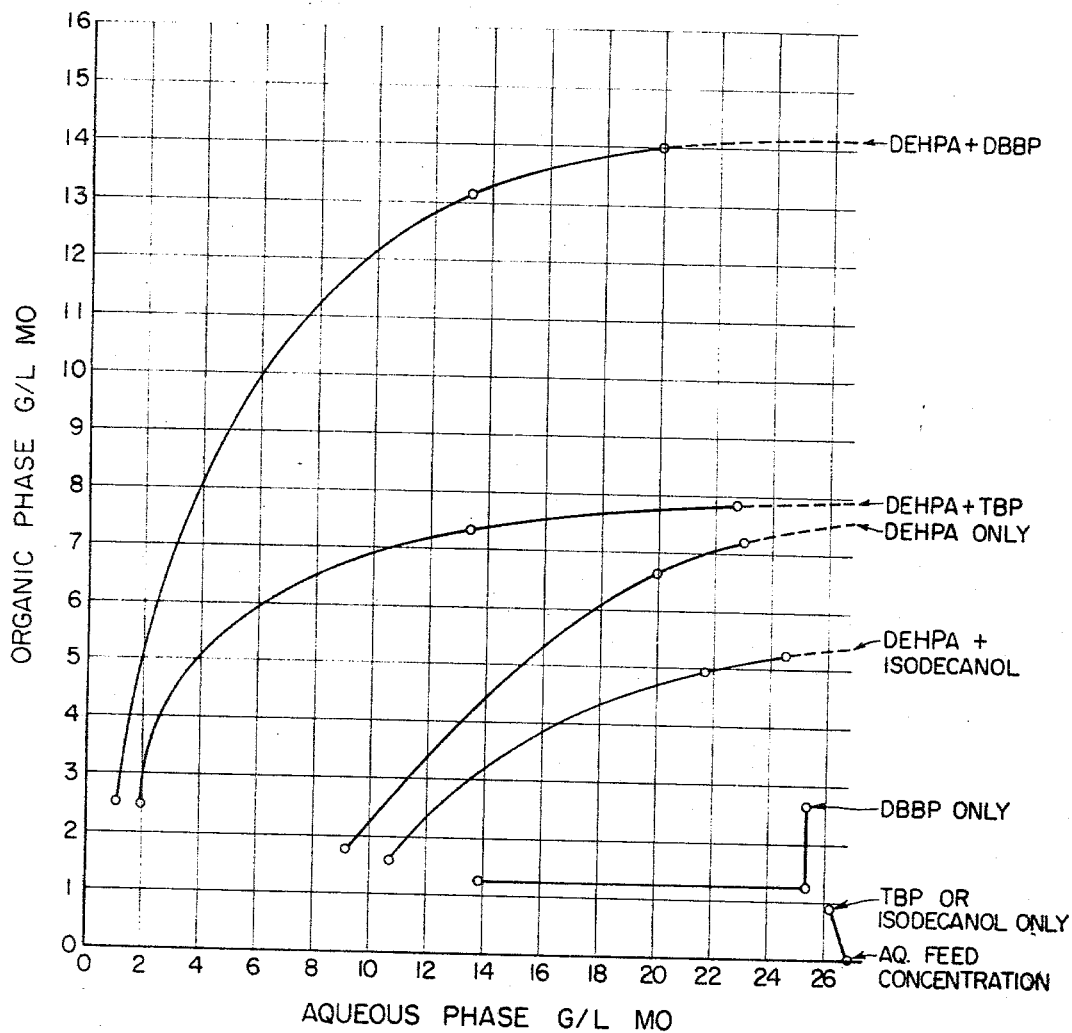

United States Patent Office 3,751,555
Patented Aug. 7, 1973

3,751,555
SOLVENT EXTRACTION PROCESS FOR THE RE-
COVERY OF MOLYBDENUM AND RHENIUM
FROM MOLYBDENITE
Hal D. Peterson, Boulder, Colo., assignor to Molybdenum
Corporation of America, Louviers, Colo.
Filed Mar. 22, 1972, Ser. No. 236,833
Int. Cl. C01g 39/00, 47/00
U.S. Cl. 423—49
10 Claims

ABSTRACT OF THE DISCLOSURE

Process for the recovery of molybdenum and rhenium values from highly acid solutions which comprises contacting the solution with a water-immiscible organic phase including a mixed extractant comprising an alkyl phosphonate and an organophosphoric acid with or without the addition of an amine extractant, or first contacting the solution with the phosphonate to selectively remove rhenium, organic acids and other impurities, followed by contacting the resulting solution with the organophosphoric acid with or without the addition of an amine extractant and an organic phosphate, and recovering the molybdenum and rhenium values from the extractant by conventional means. Process is applicable to recovery of the metal values from leach solutions having a sulfuric acid content up to 600 grams per liter resulting from nitric acid-oxidation leach of molybdenite.

BACKGROUND OF THE INVENTION

Conventional processes for the recovery of molybdenum from molybdenite involve roasting the molybdenite concentrate in air or otherwise processing it at high temperatures with the consequent release to the atmosphere of polluting gases, such as, oxides of sulfur. The molybdic oxide product produced by these processes requires extensive purification. In view of the stringent regulations now being promulgated by the states and federal government regulating the amounts of polluting gases, such as, sulfur dioxide, which can be emitted to the atmosphere, processes for the recovery of metals from molybdenite without release of sulfur-containing gases are in demand. Another requirement for new processes is that they produce a higher purity molybdic oxide product.

Rhenium, which occurs largely in molybdenite, has now become a valuable metal for use in catalytic applications and others. Prior processes for the recovery of molybdenum from molybdenite have generally not been designed for the recovery of rhenium along with the molybdenum. Substantial recovery of rhenium along with molybdenum would enhance the commercial feasibility of any molybdenum recovery process.

A nitric acid oxidation process is disclosed in copending patent application, Ser. No. 161,111, filed in the U.S. Patent Office on July 9, 1971, Daugherty et al., for "Process for the Recovery of Rhenium and Molybdenum Values from Molybdenite Concentrate," owned by Molybdenum Corporation of America, the owner of this application, in which molybdenum and rhenium values in molybdenite are solubilized by a nitric acid oxidation leach process and the major portion of the molybdenum recovered as an insoluble hydrated molybdic oxide. The remainder of the molybdenum and the rhenium is dissolved in the leach solution. The solubilized rhenium and molybdenum values must be recovered to make the overall process commercially feasible. The final recovery process must be pollution-free. Both objectives were achieved by liquid-liquid extraction.

An advantage of the above process is that it is a wet process in which no polluting gases are given off to the atmosphere. The fact that it provides for quantitative recovery of both rhenium and molybdenum makes it economically feasible. The present invention is directed to an effective procedure for final recovery of molybdenum and rhenium values from the leach medium of the nitric acid oxidation leach process which is pollution-free and provides quantitative yields of both metals.

As sulfuric acid is generated in the oxidation leach process referred to above, the resulting leach solution is highly acid, having a sulfuric acid content up to 600 g./L. Accordingly, if a solvent extraction process is used to recover the molybdenum and rhenium values from the solution, the extraction agent used must be effective at high acidity.

In the prior processes for the recovery of molybdenum by the nitric acid oxidation leach process, neutralization of formed sulfuric acid was required. Neutralization of the sulfuric acid formed in the oxidizing leach is time-consuming and the neutralization agent adds to the expense of the process. Neutralization of the sulfuric acid also eliminates the possibility of cost reduction through sale of the acid. Accordingly, it is important that the necessity for neutralization be avoided. The presence of contaminant metals or metalloids further complicates the recovery process and makes it more difficult to obtain a high purity product.

Although rhenium has been recovered from the flue gases resulting from the roasting of molybdenite as a calcined molybdic oxide product is recovered, no successful wet process for the simultaneous recovery of molybdenum and rhenium from molybdenite in substantial amounts is known. So far as is known, there are no oxidation leach processes utilizing nitric acid in which both molybdenum and rhenium are recovered from sulfide ores.

Accordingly, it is an object of this invention to provide a process for the recovery of molybdenum and rhenium values from highly acid solutions by a solvent extraction process.

Another object of the invention is to provide a wet process for the recovery of molybdenum and rhenium values from the leach solution resulting from the nitric acid oxidation leach of molybdenite in which other metal and metalloid contaminants are present.

SUMMARY OF THE INVENTION

The invention comprises contacting a solution containing molybdenum and rhenium values with water-immiscible organic phase including mixed organic extractant comprising an alkyl phosphonate, such as, dibutylbutyl phosphonate (DBBP) and an organophosphoric acid, such as di-2-ethylhexyl phosphoric acid (DEHPA) to recover molybdenum and rhenium values on the extractant followed by final recovery by conventional procedures of stripping with ammonium hydroxide, selective removal of rhenium from the eluate and final recovery of rhenium and molybdenum. Variants of the process include the addition of an amine anionic extractant and an alkyl phosphate, or selective extraction of rhenium first with the phosphonate followed by final extraction of the molybdenum with the organophosphoric acid with or without the addition of amine extractant and alkyl phosphate to the latter.

DETAILED DESCRIPTION OF THE INVENTION

In accordance with the present process, molybdenum and rhenium values can be extracted in quantitative amounts from solutions containing up to 600 grams of sulfuric acid.

The phosphonates which are operative for the invention are represented by the formula:

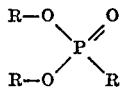

wherein R is selected from the group consisting of alkyl, aryl, and aralkyl radicals. "Alkyl" as used in the specification and claims includes branched chain alkyl and alkyl or aryl substituents while "aryl" includes aryl and alkyl substituents. Alkyl groups having from 4–18 carbon atoms in the chain are preferred in the interest of solubility of the compound in the organic solvent and its insolubility in water. Also included are such inert substituents as halides.

Examples of operative phosphonates are di-butylbutyl phosphonate, di-octylbutyl phosphonate, di-butyloctyl phosphonate, di-octadecylheptadecyl phosphonate, di-heptadecylhexadecyl phosphonate, di-1-methylheptyloctyl phosphonate, di-octylphenyloctyl phosphonate, di-octylphenyl phosphonate and di-phenylheptylheptyl phosphonate.

It has been found that the alkyl phosphonates are effective solvating agents for rhenium. These agents appear to be most effective in an acid solution. A very effective agent is di-butylbutyl phosphonate (DBBP). It is believed that the high hydrogen ion concentration aids DBBP to solubilize rhenium. Its effectiveness for solubilizing rhenium is not limited to solutions made acid with sulfuric acid as the hydrogen ion concentration is the important factor and it is effective in solutions made acid with other mineral acids, such as, hydrochloric acid, nitric acid, and other acids. Apparently, the anion of the acid is not important.

The organophosphoric acids which are operative for the invention are represented by the formula:

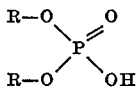

wherein R is selected from the group consisting of alkyl, aryl and aralkyl radicals.

Examples of operative organophosphoric acids are di-2-ethylhexyl phosphoric acid, di-heptadecyl phosphoric acid, di-decyl phosphoric acid, di-1-methylheptyl phosphoric acid, diisooctyl phosphoric acid, di-2-ethyl-4-methylpentyl phosphoric acid, di-octylphenyl phosphoric acid, the isooctyl or stearyl derivatives of alkyl acid phosphates, and the like.

The organic phosphates which may be used for the purpose of the invention are represented by the following formula:

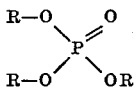

wherein R is a member selected from the group consisting of alkyl, aryl and aralkyl. Examples of operative members are tri-butyl phosphate, trioctadecyl phosphate, cresyl diphenyl phosphate, tri-cresyl phosphate, tri-phenyl phosphate, tri-octyl phosphate, tri-propyl phosphate, tri-p-tertiary butylphenyl phosphate, tri-heptadecyl phosphate, tri-1-methylbutyl phosphate and tri-1-phenylbutyl phosphate.

The preferred amine extractants used in the invention are those in which the alkyl substituents have six or more carbon atoms in the chain, including branched chain alkyl radicals. Examples are tri-lauryl amine which is a tertiary $C_{12}$ straight chain amine, tri-caprylyl amine, a tertiary amine, di-lauryl amine, a secondary straight chain amine, do-decenyl-tri-alkyl methyl amine, a homologous mixture containing 24–27 carbon atoms, a secondary amine, and tri-alkyl methyl amine, a homologous mixture containing 18–24 carbon atoms, a primary amine. The amines suitable are of the type disclosed in U.S. Pats. Nos. 3,052,516 and 3,156,524.

A wide variety of organic diluents, in which the extraction reagent is dissolved, can be employed according to this invention. The minimum requirements for the diluent, however, are that the diluent be substantially water-immiscible, that it will dissolve the extraction reagent, and that it will not interfere with the function of the reagent in extracting the metal values from aqueous metal bearing solutions. These diluents can be aliphatic or aromatic hydrocarbons, halogenated hydrocarbons, petroleum derivatives, ethers, etc. Examples of these various diluents include toluene, carbon tetra-chloride, benzene, chloroform, 2-ethyl-hexanol, and particularly kerosene.

Di 2-ethylhexyl phosphoric acid (DEHPA) has been used as a solvent extractant for molybdenum. It is a cation exchanger and at moderate to high acidity molybdenum is a cation in molybdenum solutions. At low acidity it is an anion and amines can be used to extract it as such. It was found that DEHPA was not effective on the feed solution for extracting rhenium, and was poorly effective for molybdenum. It was found, however, that when DBBP is used with DEHPA the expected solvation recovery of rhenium occurred accompanied by a pronounced synergistic effect to the end that molybdenum was rapidly extracted up to a point near the maximum exchange capacity of DEHPA. Tri-butyl phosphate (TBP) was also found to have a synergistic effect on the solvating action of DEHPA for molybdenum, although not as marked as that of DBBP.

It was noted that other effects on results of the use of DBBP are to prevent loss through solubility of DEHPA as a soluble salt during the ammonium hydroxide strip, and to improve phase separation characteristics during the extraction step.

Feed solutions resulting from leaching of molybdenite ordinarily contain soluble organic acids, such as oleic and others, added during beneficiation of the ore. They are probably oxidized to nitrates and carboxylic acids which result in poisoning of amines such that those extracted organics are very difficult to remove with alkaline scrubbing. Even small amounts of these acids in the presence of amine extractants decrease the yield significantly. It is practically impossible to remove these acids by roasting the ore so that they must always be a consideration when using amine extractants. Amines were found to be useful in combination with DEHPA for the suppression of ferric iron so that it would not be extracted with molybdenum on DEHPA. Surprisingly, it was found that DBBP solubilizes the organic acids with the result that amines can be used with DEHPA after the feed solution has first been treated with DBBP.

The single drawing included as a part of the specification is a graph of extraction equilibrium curves for molybdenum extraction with DEHPA–DBBP and DEHPA–TBP mixed extractants. The aqueous feed used for obtaining the data in the graph contained 26.64 g./l. molybdenum, 89.97 p.p.m. rhenium, and 385 g./l. sulfuric acid.

The extraction equilibrium curves of the drawing graphically illustrate the significant synergistic effect of DBBP and TBP on DEHPA for the extraction of molybdenum. From inspection of the curves it is noted that DBBP and TBP used alone have very little extraction effect on molybdenum. However, mixtures of DEHPA and TBP show a pronounced increase in the extraction capability of DEHPA for molybdenum while mixtures of DEHPA and DBBP result in quantitative recovering of molybdenum.

As indicated by the extraction equilibrium curve, an extraction agent comprised of DBBP and DEHPA proved to be a highly effective extractant for recovering both molybdenum and rhenium from the feed solution. The graph further shows that isodecanol used with DEHPA has some depressing effect for extraction of molybdenum.

As indicated by the extraction equilibrium curve, an extraction agent comprised of DBBP and DEHPA proved to be a highly effective extractant for recovering both molybdenum and rhenium from the feed solution. The graph further shows that isodecanol used with DEHPA has some depressing effect for extraction of molybdenum.

The invention has been found particularly useful for extracting rhenium and molybdenum from the leach solution resulting from the nitric acid oxidation leach of molybdenite described in the above-referenced Daughtery et al. patent application. In accordance with this process molybdenate is oxidized in an autoclave with nitric acid and oxygen at temperatures from 125°–200° C. at pressures up to about 300 p.s.i.g. Sulfuric acid is generated in the process and may be present in the leach medium in amounts up to 600 grams per liter. Substantially all of the rhenium and a portion of the molybdenum is solubilized by the oxidation leach step and is preferably recovered by liquid-liquid solvent extraction.

In the included examples illustrating this invention the feed solution or aqueous phase is from the leach medium resulting from the above-described oxidation leach process.

The following example shows the effectiveness of DBBP in solubilizing rhenium in highly acid solutions. The data is listed in Example 1 as typical extraction equilibrium data. For this example, the extraction agent comprised 25 percent by volume of DBBP in Cyclosol 53 (tri-ethyl benzene).

EXAMPLE NO. 1

Re extraction equilibrium data with DBBP extractant

| | Solution analysis | | | | Free acid as $H_2SO_4$ in aqueous phase, g./l. |
|---|---|---|---|---|---|
| | Mo, g./l. | | Re, p.p.m. | | |
| | Aqueous phase | Organic phase | Aqueous phase | Organic phase | |
| O/A ratio: | | | | | |
| 10 | 15.14 | 0.67 | 1.79 | 14.07 | 205.9 |
| 5 | 17.89 | 0.80 | 3.57 | 27.78 | 205.9 |
| 1 | 21.01 | 0.88 | 16.67 | 125.83 | 208.8 |
| 0.5 | 21.38 | 1.02 | 35.71 | 213.58 | 208.8 |
| 0.2 | 21.65 | 1.20 | 77.38 | 325.60 | 208.8 |
| 0.1 | 21.74 | 1.50 | 101.19 | 413.10 | 208.8 |
| Aqueous feed | 21.89 | | 142.50 | | 210.8 |

The example shows that rhenium in quantitative amounts is solubilized by DBBP in acid solution of varying strength.

It is obvious from the above example that DBBP can be used for the selective extraction of rhenium from other metals in solution.

A significant advantage in the use of DBBP for solvating rheniun is that rhenium can be stripped with water, thus reducing significantly the cost of the stripping agent. The following Example No. 2 demonstrates that rhenium loaded on DBBP can be stripped with water. The data is listed as typical extraction equilibrium data. In the example, the rhenium loaded extractant used comprised 25 percent by volume of DBBP in Cyclosol 53 (tri-ethyl benzene) and the stripping agent was water.

EXAMPLE NO. 2

Water strip of Re from DBBP

| | Solution analysis | | | | pH of aqueous phase |
|---|---|---|---|---|---|
| | Mo, g./l. | | Re, p.p.m. | | |
| | Aqueous phase | Organic phase | Aqueous phase | Organic phase | |
| O/A ratio: | | | | | |
| 20 | 5.05 | 1.34 | 625 | 267.7 | 0.80 |
| 10 | 3.19 | 1.27 | 575 | 241.5 | 0.90 |
| 5 | 1.80 | 1.23 | 525 | 194.0 | 1.00 |
| 1 | 0.48 | 1.11 | 250 | 49.0 | 1.30 |
| 0.5 | 0.28 | 1.03 | 150 | nil | 1.68 |
| Loaded organic | | 1.59 | | 299.0 | |

The example shows that water alone is a highly effective stripping agent for the rhenium loaded DBBP.

The following example illustrates the effectiveness of the DEHPA-DBBP mixed extractant in extracting both molybdenum and rhenium values. In obtaining the results set forth in the example, six extraction stages were used followed by two water scrubbing stages. Three ammonium hydroxide strip stages were used to remove the molybdenum and rhenium from the agent. The extractant was comprised of 25 volume percent DBBP plus 10 volume percent of DEHPA in kerosene.

EXAMPLE NO. 3

Mo and Re extraction with DBBP and DEHPA mixed extractant

| | Sample composition | | | |
|---|---|---|---|---|
| | Mo, g./l. | Re, p.p.m. | $H_2SO_4$, g./l. | $SO_4$, g./l. |
| Feed solution | 22.4 | 130.0 | 210.0 | |
| Final raffinate from extraction step | 0.03 | 1.0 | 138.0 | |
| Final scrub solution | 1.41 | 150.0 | 13.2 | |
| Aqueous concentrate from $NH_4OH$ strip | 44.72 | 257.6 | | 0.59 |

NOTE.—Mo recovery=99.8%; Re recovery=99.1%.

The effect of the combination of DBBP and DEHPA is to extract rhenium in quantitative amounts by means of fairly selective solvation with DBBP, and to effectively extract molybdenum as a cation with DEHPA aided by the synergistic effect of DBBP. It is noted that over 99 percent of each metal is recovered.

The following example is included to show the effectiveness of a three-component solvent system comprised of DEHPA, DBBP and an amine extractant, the DBBP being added to back up the amine as a rhenium extractant in the event of amine poisoning of organics while still obtaining some of the amines' iron suppression effect. In this example the three-component solvent was comprised of 10 volume percent DEHPA plus 5 volume percent DBBP plus 6 volume percent Alamine 304 in kerosene. Alamine 304 is the trade name for tri-lauryl amine sold by Dow Chemical Company of Midland, Mich.

The circuit consisted of five extraction stages, three water scrubbing stages (feeding into extraction stage 1) and three stripping stages using ammonium hydroxide solution to strip the loaded solvent of molybdenum and rhenium.

EXAMPLE NO. 4

Mo and Re extraction with DBBP-DEHPA-amine mixed extractant

| | Sample composition | | | |
|---|---|---|---|---|
| | Mo, g./l. | Re, p.p.m. | $H_2SO_4$, g./l. | $SO_4$, g./l. |
| Feed solution | 18.64 | 85.46 | 269.7 | |
| Final raffinate | 0.17 | 0.10 | 183.3 | |
| Final scrub solution | 9.86 | 6.90 | 146.8 | |
| $NH_4OH$ aqueous concentrate | 92.70 | 395.8 | | 0.15 |

NOTE.—Mo recovery=98.92%; Re recovery=99.74%.

It is noted that quantitative recoveries of molybdenum and rhenium were obtained. The DBBP in the extractant mixture was used primarily for a modifier, for rhenium extraction and synergistic effects. The Alamine 304 was used to decrease the amount of iron extracted by DEPHA and to provide initial side benefits of molybdenum and rhenium loading capabilities.

The following example is included to illustrate a two-stage system or process in which rhenium is first selectively recovered by DBBP followed by recovery of molybdenum from the raffinate by the use of an organic extractant comprising DEHPA, Alamine 304 and tri butyl phosphate. As set forth above, tri-butyl phosphate has some synergistic effect with DEHPA for the extraction of molybdenum.

In this example two separate organic mixtures were operated in isolated circuits feeding a common aqueous feed solution. The feed solution was first treated with an organic extractant consisting of 25 percent DBBP in Cyclosol 53 for removal of most of the organic acids and for rhenium extraction by solvation. This circuit consisted of five extraction stages, no scrubbing stages and two stripping stages using ammonium hydroxide to remove rhenium from the agent.

The aqueous solution leaving this circuit, still containing most of the molybdenum and a small amount of rhenium passed on to the extraction section of a second circuit in which the extractant used was an organic composition of 5 volume percent of DEHPA plus 2 volume percent Alamaine 304 plus 5 volume percent tri-butyl phosphate with kerosene as diluent. The apparatus consisted of four extraction stages, two water scrubbed stages (feeding into extractions) and one strip stage using ammonium hydroxide to remove molybdenum from the extractant.

EXAMPLE NO. 5

Selective recovery of Re with DBBP and final recovery of Mo with DEHPA-amine-TBP mixed extractant

| | Sample composition [1] | | | |
|---|---|---|---|---|
| | Mo, g./l. | Re, p.p.m. | $H_2SO_4$, g./l. | $SO_4$, g./l. |
| Rhenium circuit operation [1] | | | | |
| Feed solution | 21.86 | 148.4 | 210.8 | |
| Final raffinate | 20.78 | 4.55 | 205.8 | |
| Water aqueous concentrate | 16.60 | 2,200 | | |
| Molybdenum circuit operation [2] | | | | |
| Feed solution | 20.78 | 4.55 | 205.8 | |
| Final raffinate | 0.57 | Nil | 107.9 | |
| Final scrub solution | 1.11 | Nil | 11.0 | |
| $NH_4OH$ aqueous concentrate | 149.02 | 33.3 | | 1.97 |

[1] Mo extracted=4.94%. Re Recovered=96.93%.
[2] Mo extracted, this circuit=91.08%; cumulative by both circuits= 96.02%. Re extracted, this circuit=3.07%; cumulative by both circuits= 100.00%.

The amine (Alamine 304) remained completely active only because of prior extraction of the organics by DBBP. This example shows that rhenium and molybdenum can be recovered from the feed solution by selective extraction with DBBP being used in the first extraction to remove rhenium and the organic acids which poison amines, followed by use of DEHPA and an amine extractant in the second step to recover molybdenum. It follows from the example that the mixed extractant of the invention includes a DBBP–DEHPA-Amine-TBP mixture.

As is well known, ammonium hydroxide is an effective stripping agent for removing both molybdenum and rhenium from extractants. Rhenium can then be selectively recovered from the resulting alkaline solution with a quaternary ammonium type extractant. The molybdenum is recovered from the eluate by evaporative procedures and the rhenium is recovered from the extractant with perchloric acid or perchlorate salt with final recovery of rhenium by conventional procedures.

The following example was performed to illustrate a typical stripping of molybdenum and rhenium from the organic extractant followed by extraction of rhenium from the strongly ammoniacal strip concentrate with molybdenum being recovered from the concentrate by conventional evaporative procedures. In the example the feed solution was that obtained by stripping the extractant in Example 5 with ammonium hydroxide. In this example rhenium was selectively extracted from the feed solution with Aliquat 336, a quaternary amine extractant, in Cyclosol 53 (tri-ethyl benzene) diluent. The rhenium was then stripped from the extractant with 1.0 normal perchloric acid as a stripping agent. Molybdenum was recovered from the eluate of the Aliquat 336 strip by evaporative procedures.

EXAMPLE NO. 6

Final recovery of Mo and Re from extractant [1]

| | Aqueous sample composition | |
|---|---|---|
| | Mo, g./l. | Re, p.p.m. |
| Feed solution | 66.81 | 352.0 |
| Final raffinate | 67.80 | 4.13 |
| Final scrub solution | 0.004 | 0.0007 |
| $HCLO_4$ strip concentrate | 0.0006 | 11,940.0 |

Mo-Re loss in the separation and recovery procedure and final Re purification [2]

| | Mo lost, percent | Re lost, percent |
|---|---|---|
| Separation and recovery | 1.08 | 0.26 |
| Re purification | 0.00001 | 1.22 |
| Total loss | 1.08001 | 1.48 |

[1] Mo lost to strip concentrate=0.00001%; Re recovered=98.78%.
[2] Overall recovery=98.92% Mo, 98.52% Re.

It is noted that a high percentage recovery of rhenium and molybdenum values in the ammonium hydroxide strip solution was obtained. An alternative stripping procedure to that disclosed above it to selectively strip rhenium from the extractant with water followed by final stripping of the molybdenum with ammonium hydroxide.

The preferable amounts of agents for the mixed extractants are as follows: If DBBP is used solely as a modifier the preferable percentage composition is a 1:10 ratio with a diluent. If it is used alone for the selective extraction of rhenium it may be used in percentages as high as 25% by volume of the diluent. When the combination of DEHPA and DBBP is used, the volume percentage of DBBP to DEHPA may vary from 15 to 25 volume percent per 10 volume percent of DEHPA in the solvent. Volumes in excess of the upper figure apparently have no additive effect.

While the invention has been illustrated by its application to a feed solution resulting from the nitric acid oxidation leach of molybdenite, it is not limited to this feed solution as it is operative for acidic solutions in general. It can be adapted to continuous countercurrent and other liquid-liquid extraction systems.

I claim:

1. A process for the recovery of molybdenum and rhenium values from acid solution which comprises contacting the solution with a water-immiscible organic phase including an organic extraction reagent comprising an organic phosphonate having the formula:

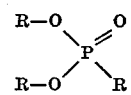

wherein R is a member selected from the group consisting of alkyl, radicals having from 4–18 carbons in the alkyl chain aryl and aralkyl radicals, and an organophosphoric acid having the formula:

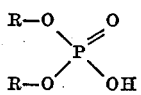

wherein R is a member selected from the group consisting of alkyl, aryl and aralkyl radicals, the volume ratio of organic phosphonate to organophosphoric acid being about 15–25 volume percent of the phosphonate to 10 volume percent of the organophosphoric acid, and recovering molybdenum and rhenium from the organic phase.

2. The process of claim 1 in which an amine anion extractant is included in the organic extraction reagent in sufficient amount to suppress the extraction of ferric iron in the solution by the organophosphoric acid.

3. The process of claim 1 in which the phosphonate is di-butylbutyl phosphonate.

4. The process of claim 1 in which the organophosphoric acid is di-2-ethylhexyl phosphoric acid.

5. The process of claim 1 in which the phosphonate is di-butylbutyl phosphonate and the organophosphoric acid is di-2-ethylhexyl phosphoric acid.

6. The process of claim 1 in which rhenium is recovered from the loaded organic extraction reagent by stripping with water.

7. The process of claim 1 in which molybdenum and rhenium are stripped from the loaded organic extraction reagent with ammonium hydroxide and rhenium is selectively recovered from the eluate with a quaternary ammonium extractant.

8. A process for the recovery of molybdenum and rhenium from acid solution which comprises: first selectively recovering the rhenium from solution by,
(a) contacting the solution with a water-immiscible organic phase including in a sufficient amount to recover all of the rhenium in the solution an organic phosphonate having the formula:

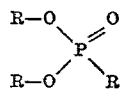

wherein R is a member selected from the group consisting of alkyl radicals having from 4–18 carbon atoms in the alkyl chain, aryl and aralkyl radicals,
(b) separating said water-immiscible organic phase loaded with rhenium from the remainder of the solution,
(c) recovering molybdenum from the remaining solution by contacting the solution with a water-immiscible organic phase including in an amount sufficient to recover all of the molybdenum in solution an organophosphoric acid having the formula:

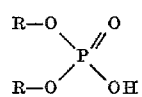

wherein R is a member selected from the group consisting of alkyl radicals having from 4–18 carbon atoms in the chain, aryl and aralkyl radicals,
(d) recovering rhenium from the water immiscible organic phase of step (b), and
(e) recovering molybdenum from the organic phase of step (c).

9. The process of claim 8 in which there is added to the organophosphoric acid of step (c) in an amount sufficient to synergize the extraction of molybdenum an organic phosphonate conforming to the formula of step (a).

10. The process of claim 8 in which an amine anion extractant is included in the organic phase of step (c) in sufficient amount to suppress the extraction of ferric iron in the solution by the organophosphoric acid.

References Cited

UNITED STATES PATENTS

| | | | |
|---|---|---|---|
| 3,607,236 | 9/1971 | Brooks et al. | 75—101 BE |
| 3,607,008 | 9/1971 | Chiola et al. | 423—54 |
| 3,576,597 | 4/1971 | Chiola et al. | 423—54 |
| 3,239,565 | 3/1966 | Kreeuoy et al. | 75—101 BE |
| 3,495,934 | 2/1970 | Ziegenlalg et al. | 75—101 BE |

OTHER REFERENCES

Blake et al., "Proceedings of International Conference on Peaceful Uses of Atomic Energy," vol. 28, Geneva, 1958, pp. 289–298.

HERBERT T. CARTER, Primary Examiner

U.S. Cl. X.R.

75—101 BC; 423—54

UNITED STATES PATENT OFFICE
CERTIFICATE OF CORRECTION

Patent No. 3,751,555            Dated August 7, 1973

Inventor(s) Hal D. Peterson

It is certified that error appears in the above-identified patent and that said Letters Patent are hereby corrected as shown below:

Column 6, lines 39 and 40, "Dow Chemical Company of Midland, Mich." should be --General Mills, Inc. of Minneapolis, Minn.--.

Column 7, line 56 "eluate" should be --raffinate--; line 74, "eluate" should be --raffinate-- and "strip_ should be --extraction--.

Signed and sealed this 19th day of November 1974.

(SEAL)
Attest:

McCOY M. GIBSON JR.            C. MARSHALL DANN
Attesting Officer                Commissioner of Patents